United States Patent
Zhao et al.

(10) Patent No.: US 9,960,938 B2
(45) Date of Patent: *May 1, 2018

(54) HYBRID WAVEFORM DESIGN COMBINING OFDM AND CYCLIC PREFIX BASED SINGLE CARRIER FOR MILLIMETER-WAVE WIRELESS COMMUNICATION

(71) Applicant: QUALCOMM Incorporated, San Diego, CA (US)

(72) Inventors: Lu Zhao, Spardorf (DE); Juan Montojo, San Diego, CA (US); Christian Pietsch, Nuremberg (DE)

(73) Assignee: QUALCOMM Incorporated, San Diego, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/615,583

(22) Filed: Jun. 6, 2017

(65) Prior Publication Data

US 2017/0272286 A1    Sep. 21, 2017

Related U.S. Application Data

(63) Continuation of application No. 15/233,304, filed on Aug. 10, 2016, now Pat. No. 9,686,108, which is a
(Continued)

(51) Int. Cl.
*H04W 4/00* (2018.01)
*H04L 27/00* (2006.01)
(Continued)

(52) U.S. Cl.
CPC ........ *H04L 27/0006* (2013.01); *H04L 5/0048* (2013.01); *H04L 27/2607* (2013.01); *H04L 27/2613* (2013.01); *H04L 27/2636* (2013.01)

(58) Field of Classification Search
None
See application file for complete search history.

(56) References Cited

U.S. PATENT DOCUMENTS

| 9,444,595 B2 | 9/2016 | Zhao et al. |
| 2005/0058230 A1 | 3/2005 | Thomas et al. |

(Continued)

FOREIGN PATENT DOCUMENTS

WO    WO-2007149290 A2    12/2007

OTHER PUBLICATIONS

ISA/EPO, International Search Report and Written Opinion of the International Searching Authority, Int'l Appl. No. PCT/US2015/022003, dated Jun. 22, 2015, European Patent Office, Rijswijk, NL, 9 pgs.

*Primary Examiner* — Otis L Thompson, Jr.
(74) *Attorney, Agent, or Firm* — Qualcomm IP Dept.; James Hunt Yancey, Jr.

(57) ABSTRACT

Methods, systems, and devices are described for generating a hybrid waveform for data transmission between a transmitting device and a receiving device. The transmitting device may employ an OFDM processing technique to periodically transmit known first pilot symbols mapped from a signal constellation where each signal has equal energy during a first time period and a cyclic prefix based single-carrier (CP-SC) processing technique to transmit data packets and second known pilot symbols during a second time period. Channel estimation is based on first pilot symbols, which are inserted into all subcarriers of OFDM symbol blocks within a specific period. Channel estimation tracking is based on the second pilot symbols interleaved within data packets. The receiving device may be configured to estimate CSI based in part on first pilot symbols and to track the channel estimation based in part on the second pilot symbols in order to provide reliable data detection.

17 Claims, 14 Drawing Sheets

Related U.S. Application Data continuation of application No. 14/242,609, filed on Apr. 1, 2014, now Pat. No. 9,444,595.

(51) Int. Cl.
*H04L 27/26* (2006.01)
*H04L 5/00* (2006.01)

(56) References Cited

U.S. PATENT DOCUMENTS

| | | | |
|---|---|---|---|
| 2006/0039273 A1* | 2/2006 | Gore | H04L 5/0044 370/208 |
| 2007/0135166 A1* | 6/2007 | Ding | H04L 5/0007 455/561 |
| 2009/0219801 A1* | 9/2009 | Jeong | H04L 5/0048 370/210 |
| 2010/0135149 A1 | 6/2010 | Li et al. | |
| 2011/0081933 A1* | 4/2011 | Suh | G01S 5/0236 455/509 |
| 2013/0039193 A1 | 2/2013 | Yin et al. | |
| 2013/0148488 A1 | 6/2013 | Gao et al. | |
| 2013/0170333 A1 | 7/2013 | Yun et al. | |
| 2013/0258935 A1 | 10/2013 | Zhang et al. | |
| 2013/0266086 A1 | 10/2013 | Yang et al. | |
| 2013/0301538 A1 | 11/2013 | Muharemovic et al. | |
| 2015/0171937 A1 | 6/2015 | Murakami et al. | |
| 2015/0195077 A1* | 7/2015 | Kim | H04L 5/0048 370/329 |
| 2016/0352546 A1 | 12/2016 | Zhao et al. | |

\* cited by examiner

HYBRID WAVEFORM DESIGN COMBINING OFDM AND CYCLIC PREFIX BASED SINGLE CARRIER FOR MILLIMETER-WAVE WIRELESS COMMUNICATION

CROSS REFERENCES

The present Application for Patent is a continuation of U.S. patent application Ser. No. 15/233,304, titled "Hybrid Wave Form Design Combining OFDM and Cyclic Prefix Based Single Carrier for Millimeter-Wave Wireless Communication," filed Aug. 10, 2016, which is a continuation of U.S. patent application Ser. No. 14/242,609 by Zhao, et al., titled "Hybrid Waveform Design Combining OFDM and Cyclic Prefix Based Single Carrier For Millimeter-Wave Wireless Communication," filed Apr. 1, 2014, assigned to the assignee hereof.

BACKGROUND

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems. Wireless Local Area Networks (WLANs), such as Wi-Fi (IEEE 802.11) networks are also widely deployed and used.

Generally, a wireless multiple-access communications system may include a number of base stations or access points, each simultaneously supporting communication for multiple mobile devices. Base stations or access points may communicate with mobile devices on downstream and upstream links. Each base station or access point (AP) has a coverage range, which may be referred to as the coverage area of the cell. Wireless communication between base stations and mobile devices may include high data rates. In such situations, the performance of a wireless communication system is mainly governed by the wireless channel environment. High data rate transmission and high mobility of transmitters and/or receivers usually experiences challenging frequency-selective and time-selective fading channel conditions. Mitigating such fading conditions results in an efficient data transmission.

Accurate estimate of channel state information (CSI) impacts the performance of a wireless communication system. In contrast to the typical static characteristics of a wired channel, the wireless channel may be dynamic and change quickly. Orthogonal frequency division multiplexing (OFDM) has been conventionally adopted for a wide range of wireless and wireline applications. The major virtues of OFDM include its resilience to multipath propagation, the possibility of achieving channel capacity, and the availability of frequency diversity scheduling in multiuser communication systems. However, although the OFDM based transmission has become the physical layer for broadband communications, it suffers from several drawbacks including a large peak-to-average power ratio (PAPR), intolerance to amplifier nonlinearities, and high sensitivity to carrier frequency offsets. As a result, implementation of an OFDM system to transmit data across a wireless channel may not be optimal for certain wireless systems.

An alternative approach to OFDM systems focuses on Cyclic Prefix (CP) single-carrier (SC) modulation techniques. While a CP based single-carrier transmission system with frequency-domain equalization may provide a lower peak-to-average power ratio than an OFDM system, the CP based SC systems may suffer from poor channel estimation with comparable or even high implementation complexity against OFDM system in a fast-variant channel environment. Therefore, adoption of CP based SC modulation techniques to assist with channel estimation may not be ideal. While both OFDM and SC modulation techniques provide certain unique advantages, each suffers from inherent drawbacks that negatively impact the performance of a wireless channel with respect to channel estimation and data transfer.

SUMMARY

The present disclosure generally relates to one or more improved systems, methods, and/or apparatuses for generating a hybrid waveform for data transmission between a transmitting device and a receiving device. In certain embodiments, the transmitting device (e.g., a base station and/or mobile device) may employ an OFDM processing technique to periodically transmit known first pilot symbols during a first time period and a cyclic prefix based single-carrier (CP-SC) processing technique to transmit data packets and a plurality of second pilot symbols during a second time period. In some examples, channel estimation is based on the first pilot symbols, which may be inserted into all subcarriers of OFDM symbol blocks within a specific period. The receiving device may estimate CSI based on the first pilot symbols, track the channel estimation based on the second pilot symbols, and thus provide reliable data detection. By adopting a hybrid waveform comprising an OFDM processing technique for channel estimation and a CP-SC for tracking channel conditions and transmitting data, the present disclosure realizes benefits of both the OFDM and CP-SC modulating schemes while minimizing the drawbacks of each.

In accordance with a first set of illustrative examples, a disclosed method for transmitting data in a wireless communication is described. In one example, the method includes generating a first subframe for transmission based at least in part on a first pilot symbols using a first processing technique. The method may further include generating a second subframe for transmission based at least in part on a second pilot symbols using a second processing technique. In such an example, the first processing technique and the second processing techniques are different. The illustrative method may further comprise transmitting the first and second subframes.

In certain examples, the first processing technique may comprise Orthogonal Frequency-Division Multiplexing (OFDM) and the second processing technique may comprise cyclic prefix single carrier (CP-SC). Generating the first subframe for transmission may comprise mapping the plurality of first pilot symbols onto a signal constellation. Each signal on the constellation may have equal energy. The method may further comprise converting the signal constellation from a frequency domain to a time domain by applying an inverse fast Fourier transform (IFFT) to the plurality of first pilot symbols. In yet another example, generating the second subframe for transmission may comprise inserting a cyclic prefix and plurality of second pilot symbols into the second subframe.

In certain examples, the plurality of second pilot symbols may be inserted into the second subframe according to an equal time delay. Yet in another example, the plurality of second pilot symbols may be inserted into the second subframe according to an unequal time delay. The first pilot symbols may be used by a receiver to conduct channel estimation. Conversely, the plurality of second pilot symbols may be used for channel estimation tracking. In some examples the wireless communication operates over an unlicensed frequency spectrum. The unlicensed frequency spectrum may comprise a 60 GHz band. In certain examples, the first subframe may be transmitted during a first time period and the second subframe may be transmitted during a second time period. The first and second time periods may be adjacent.

According to a second set of illustrative embodiments, an example of an apparatus for transmitting data in a wireless communication is disclosed. The apparatus may comprise a processor and a memory in electronic communications with the processor. The memory may embody instructions, the instructions being executable by the processor to generate a first subframe for transmission based in part on a first pilot symbols using a first processing technique. The instructions being executable by the processor may further generate a second subframe for transmission based at least in part on a second pilot symbols using a second processing technique. The first processing technique and the second processing technique may be different. The processor may further transmit the first and second subframes. In certain examples, the apparatus may further implement one or more aspects of the method for transmitting data in a wireless communication system described above with respect to the first set of illustrative embodiments.

According to a third set of illustrative embodiments, an example of an apparatus for transmitting data in a wireless communication is disclosed. In one example, a first processing module may generate a first subframe for transmission based at least in part on a first pilot symbols using a first processing technique. In another example, a second processing module may generate a second subframe for transmission based at least in part on a second pilot symbols using a second processing technique. The first processing technique and the second processing technique may be different. A transmitter module may transmit the first and second subframes. In certain examples, the apparatus may further implement one or more aspects of the method for transmitting data in a wireless communication system described above with respect to the first set of illustrative embodiments.

According to a fourth set of illustrative embodiments, a method for receiving data in a wireless communication system is disclosed. In some examples, the method may comprise receiving, at a receiving device, a first subframe encoded using a first processing technique and a second subframe encoded using a second processing technique during a first and second time periods respectively. The method may further comprise estimating initial channel conditions based in part on the first pilot symbols, wherein the first pilot symbols are received, at the receiving device, in the first subframe. Yet further, the method may track channel conditions based in part on a plurality of second pilot symbols, wherein the plurality of second pilot symbols are received in the second subframe. A plurality of data packets may be detected based in part on the channel estimates and in part on the channel estimation tracking information.

In some examples, the first processing technique may comprise orthogonal frequency division multiplexing processing and the second processing technique may comprise cyclic-prefix single-carrier (CP-SC) processing.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
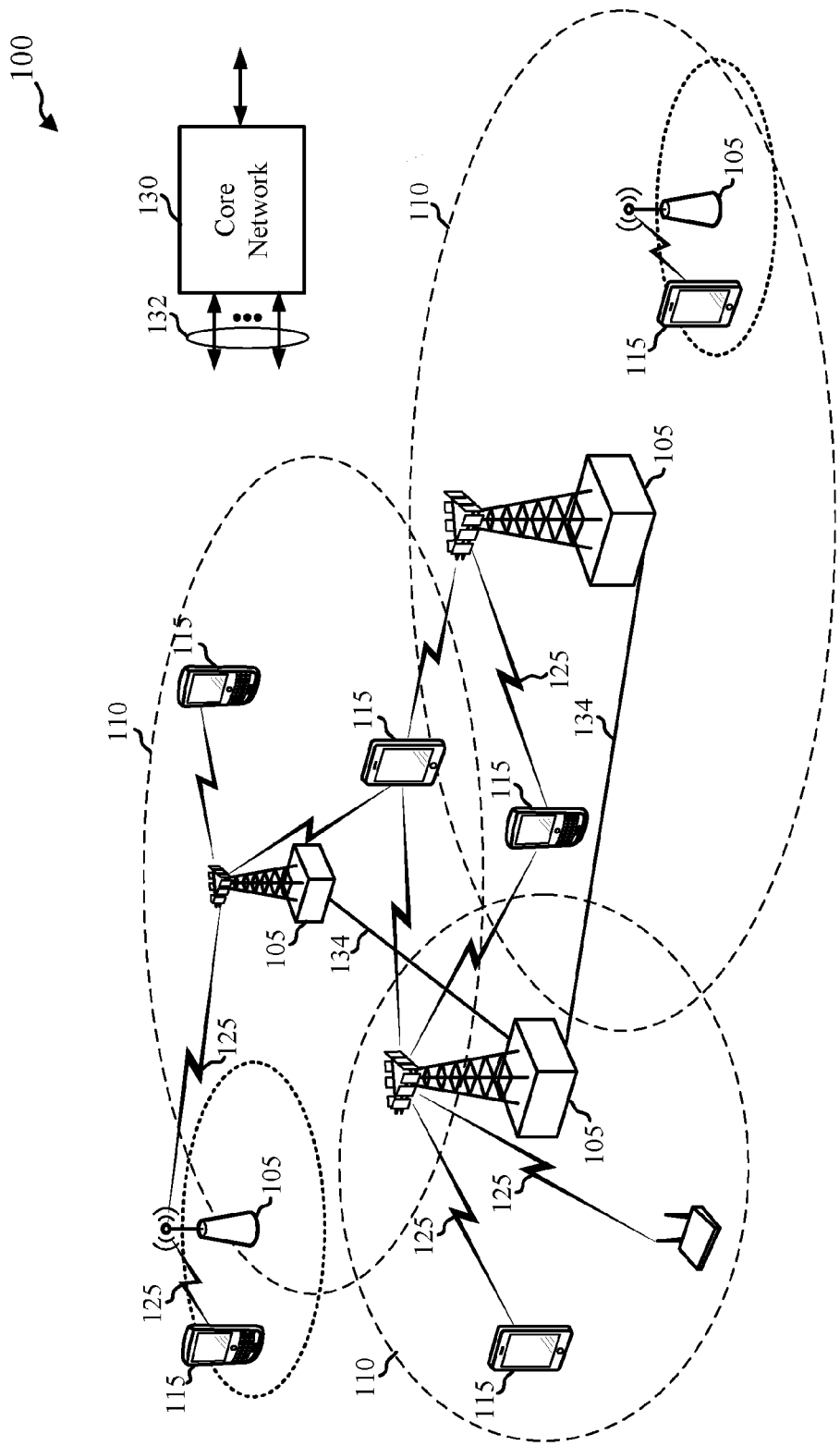
FIG. 1, shows a diagram illustrating an example of a wireless communications system, in accordance with various aspects of the present disclosure.

In certain embodiments, a transmitting device (e.g., a base station and/or mobile device) may employ an OFDM processing technique to periodically transmit known first pilot symbols during a first time period and a cyclic prefix based single-carrier (CP-SC) processing technique to transmit data packets during a second time period. In some examples, channel estimation is based on a block-type pilot arrangement, wherein the pilot symbols may be inserted into all subcarriers of the OFDM symbol blocks within a specific period. Based in part on such pilot symbols, the receiving device may be configured to estimate CSI and provide reliable data detection. In yet further examples of the present disclosure, scatter pilot symbols may be interleaved (multiplexed) with the data packets based on the CP-SC processing technique. The scatter pilot symbols may allow the receiving device to track channel conditions following an initial estimation based on the known first pilot symbols. In some embodiments, the transmission between the base station (or access point) and mobile device may include a millimeter-wave wireless communication operating over an unlicensed frequency spectrum.

By adopting a hybrid waveform comprising an OFDM processing technique for channel estimation and a CP-SC for tracking channel conditions and transmitting data, the present disclosure realizes benefits of both the OFDM and CP-SC modulating schemes while minimizing the drawbacks of each. Such realized inventive features significantly overcomes the drawbacks of conventional systems and/or methods.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

The following description provides examples, and is not limiting of the scope, applicability, or configuration set forth in the claims. Changes may be made in the function and arrangement of elements discussed without departing from the scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

FIG. 1, shows a diagram illustrating an example of a wireless communications system 100, in accordance with various aspects of the present disclosure. The wireless communication system 100 includes a plurality of base stations 105 (e.g., eNBs, WLAN access points, or other access points), a number of user equipments (UEs) 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., pilot symbols, reference signals, control channels, etc.), overhead information, data, etc. The system 100 may be a multi-carrier LTE network capable of efficiently allocating network resources.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area (not shown). The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

The wireless communication system 100 may be or include a heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time. The techniques described herein may be used for either synchronous or asynchronous operations.

The UEs 115 may be dispersed throughout the wireless communication system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro eNBs, pico eNBs, femto eNBs, relays, and the like. A UE 115 may also be able to communicate over different types of access networks, such as cellular or other WWAN access networks, or WLAN access networks. In some modes of communication with a UE 115, communication may be conducted over a plurality of communication links 125 or channels (i.e., component carriers), with each channel or component carrier being established between the UE and one of a number of cells (e.g., serving cells, which in some cases may be different base stations 105).

The communication links 125 shown in wireless communication system 100 may include uplink channels (or component carriers) for carrying uplink (UL) communications (e.g., transmissions from a UE 115 to a base station 105) and/or downlink channels (or component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions.

In certain examples of the present disclosure, a UE 115 may communicate with a serving base station 105 using a millimeter-wave (MMW) wireless communication channel operating in the 57-66 GHz unlicensed frequency spectrum. In other examples, the UE 115 may communicate with the serving base station 105 using released MMW bands at 70, 80 and 90 GHz, including, but not limited to licensed and unlicensed bands. In certain embodiments, a transmitting device (e.g., base station 105 and/or UE 115) may transmit control information (e.g., pilot symbols) to a receiving device (e.g., base station 105 and/or UE 115) over a communication link 125 using an OFDM processing technique. The receiving device may estimate channel conditions between the transmitting device and the receiving device based at least in part on the received pilot symbols. The transmitting device may further transmit a plurality of scatter pilot symbols (second pilot symbols) interleaved with data packets over the wireless channel using a CP-SC processing technique. The scatter pilot symbols may facilitate channel estimation tracking.

Figure 2:
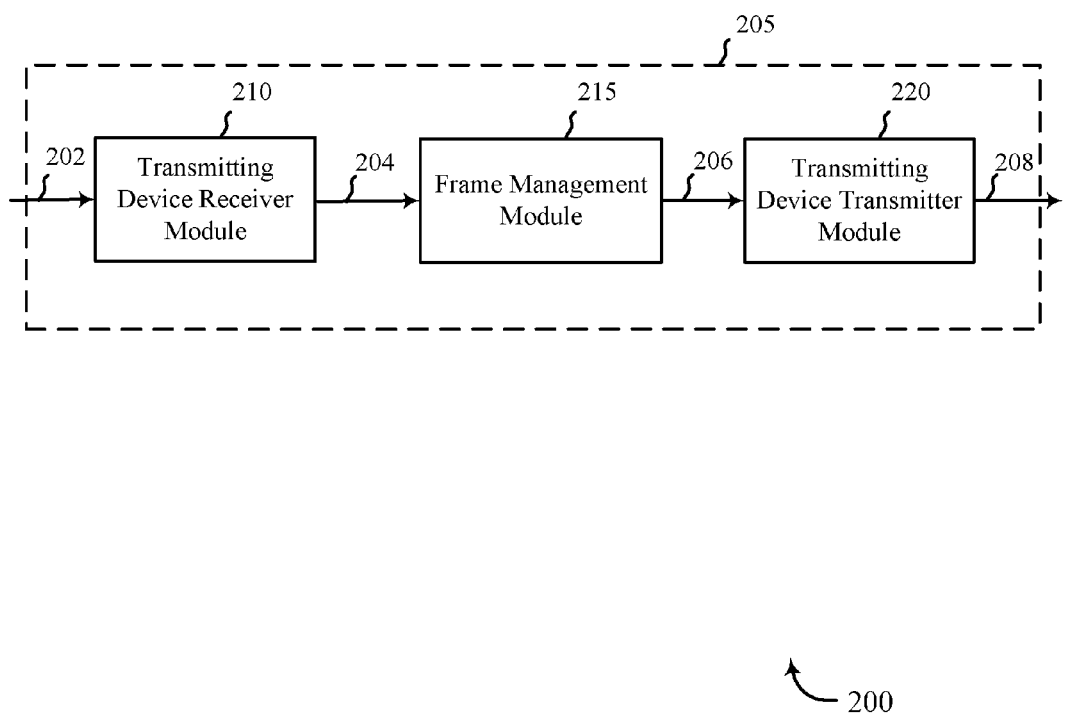
FIG. 2 shows a block diagram of an exemplary wireless communications system of a transmitting device that may be implemented in either the base station and/or the mobile station, in accordance with various aspects of the present disclosure.

FIG. 2 shows a block diagram 200 of an apparatus 205 for use in wireless communication, in accordance with various aspects of the present disclosure. In some examples, the apparatus 205 may be an example of a transmitting device, for example, one or more of the base stations 105 and/or UEs 115 described with reference to FIG. 1. The apparatus 205 may also be a processor. The apparatus 205 may include a transmitting device receiver module 210, a frame management module 215, and/or a transmitting device transmitter module 220. Each of these components may be in communication with each other.

The components of the apparatus 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The transmitting device receiver module 210 may be used to receive various types of data and/or control signals (i.e., transmissions, pilot symbols) over one or more communication links of a wireless communication system, such as one or more communication links 125 of the wireless communication system 100 described with reference to FIG. 1. The transmitting device receiver module 210 may further receive data and/or control signals from internal components (not shown) of the transmitting device 205. The transmitting device receiver module 210 may receive information such as packet, data, and/or signaling information via signal 202. The received information may be utilized by the frame management module 215 to establish communication with a receiving device, such as, at least one or more other UEs 115 and/or base stations in communication with the transmitting device 205 described with reference to FIG. 1.

The frame management module 215 may be used to control the receipt of wireless communications via the transmitting device receiver module 210 and/or to control the transmission of wireless communications via the transmitting device transmitter module 315. Controlling the transmission of wireless communications of the transmitting device transmitter module 220 may comprise generating a plurality of frames and subframes based in part on the control information (e.g., pilot symbols) and a plurality of data packets obtained from the transmitting device receiver module 210 via signal 204. The frame management module 215 may identify each of the received types of data and/or control signals and generate subframes in accordance with at least one of a plurality of processing techniques known in the art. In certain examples, the processing techniques may comprise an OFDM and/or a CP-SC processing technique configured to generate subframes based in part on the type of identified information. The generated subframes may be forwarded to the transmitting device transmitter module 220 via signal 206 to be modulated over the wireless channel.

The transmitting device transmitter module 220 may include at least one RF transmitter. The transmitter module 220 may be used to transmit various types of data and/or control signals (i.e., transmissions, pilot symbols) over one or more communication links of a wireless communication system, such as one or more communication links 125 of the wireless communication system 100 described with reference to FIG. 1 in accordance with the hybrid waveforms described in present disclosure. The transmitter module 220 may transmit information such as packets, data, and/or signaling information based in part on the generated frames and subframes prepared by the frame management module 215 via communication link 208.

Figure 3:
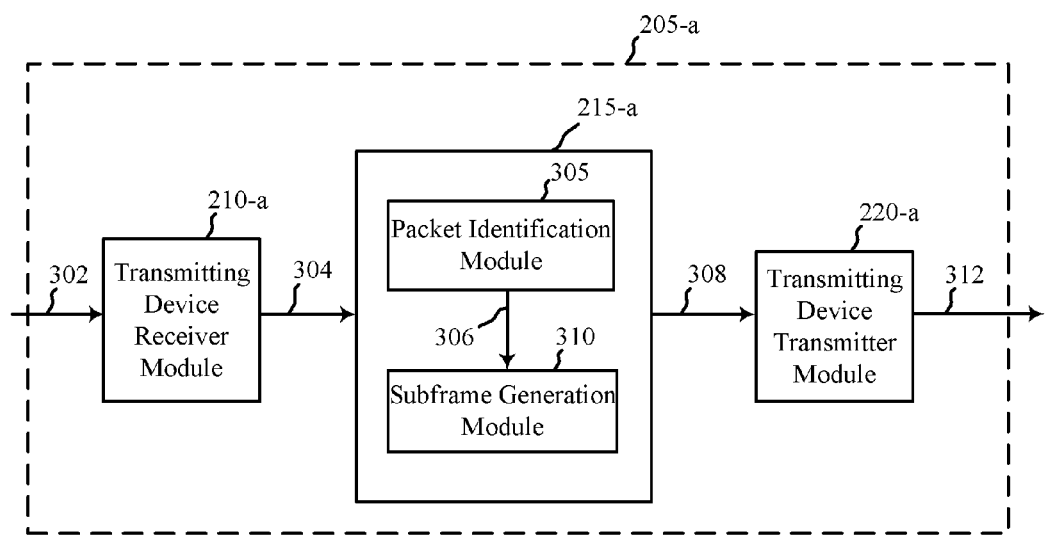
FIG. 3 shows a block diagram of an exemplary wireless communications system, in accordance with the present disclosure.

FIG. 3 shows a block diagram 300 of an apparatus 205-*a* for use in wireless communication, in accordance with various aspects of the present disclosure. In some examples, the apparatus 205-*a* may be an example of the transmitting device 205 described with reference to FIG. 2. The apparatus 205-*a* may also be a processor. The apparatus 205-*a* may include a transmitting device receiver module 210-*a*, a frame management module 215-*a*, and/or a transmitting device transmitter module 220-*a* as described with reference to FIG. 2. In accordance with the present disclosure, the frame management module 215-*a* may further include a packet identification module 305 and/or a subframe generation module 310. Each of these components may be in communication with each other.

The components of the apparatus 205-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the transmitting device receiver module 210-*a* and the transmitting device transmitter module 220-*a* may operate and function as previously described with reference to FIG. 2. In some examples, the transmitting device receiver module 210-*a* may forward various types of data and/or control signals (i.e., transmissions, pilot symbols) received at the receiver module 205-*a* via signal 302 to the frame management module 215-*a* via communication link 304. In some examples, the packet identification module 305 may identify and distinguish the various types of data and/or control signals into a plurality of regular pilot symbols (first pilot symbols), a plurality of scatter pilot symbols (second pilot symbols) and a plurality of data packets. The packet identification module 305 may forward the identified pilot symbols and data packets to the subframe generation module 310 via communication link 306 for processing.

In certain embodiments, the subframe generation module 310 may receive a plurality of identified pilot symbols and a plurality of identified data packets. The subframe generation module 310 may prepare frames and/or a plurality of subframes in accordance with one of a plurality of processing techniques. The plurality of processing techniques may comprise one or more of the multi-carrier OFDM and/or CP-SC processing techniques. In certain examples, the subframe generation module 310 may generate a first subframe using the multi-carrier OFDM processing technique based on identified regular pilot symbols. In yet further example, the subframe generation module 310 may generate a second subframe using a CP-SC processing technique based in part on the identified data packets and a plurality of scatter pilot symbols. The subframe generation module 310 may generate a plurality of subframes in accordance with at least one of the processing techniques and forward the generated subframes to the transmitting device transmitter module 220-*a* via communication link 308. The transmitter module 220-*a* may modulate the generated subframes over the wireless channel 312 using any of the known modulation techniques including, but not limited to phase-shift keying (PSK), quadrature amplitude modulation (QAM), frequency-shift keying (FSK), and/or amplitude-shift keying (ASK).

Figure 4:
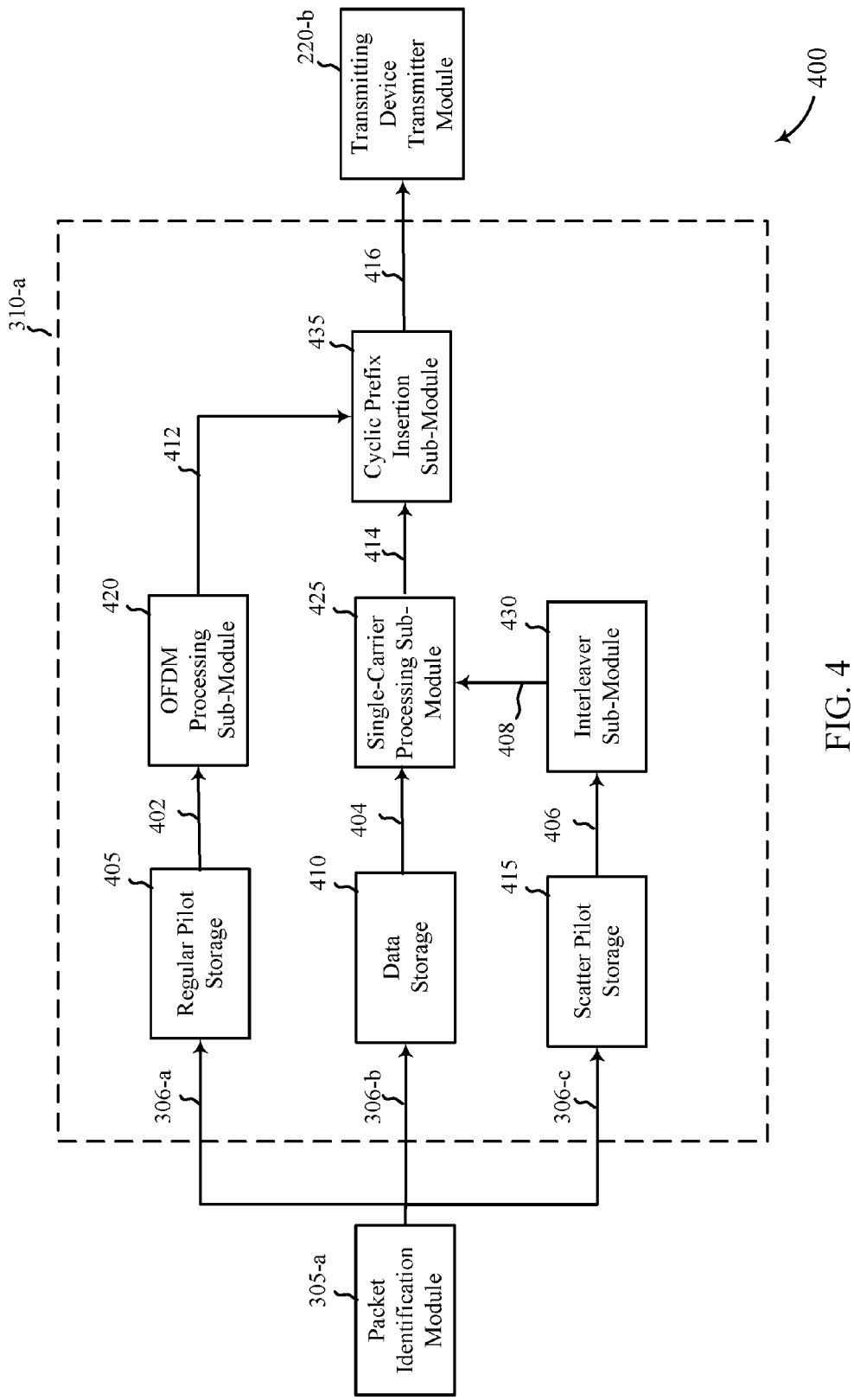
FIG. 4 shows a block diagram of an exemplary wireless communications system of a transmitting device including a subframe generation module, in accordance with various aspects of the present disclosure.

FIG. 4 shows a block diagram 400 of an apparatus 310-*a* for use in wireless communication, in accordance with various aspects of the present disclosure. In some examples, the apparatus 310-*a* may be an example of the subframe generation module 310 described with reference to FIG. 3. FIG. 4 also shows block diagrams of packet identification module 305-*a* and a transmitter device transmitter module 220-*b*. In some examples, the packet identification module 305-*a* may be an example of the packet identification module 305 described with reference to FIG. 3. Similarly, the transmitting device transmitter module 220-*b* may be an example of the transmitter module 220 described with reference to FIG. 2 and/or FIG. 3. The apparatus 310-*a* may also be a processor. The apparatus 310-*a* may include a regular pilot storage 405, data storage 410, scatter pilot storage 415, OFDM processing sub-module 420, single-carrier processing sub-module 425, interleaver sub-module 430 and/or a cyclic prefix insertion sub-module 435. Each of these components may be in communication with each other.

The components of the apparatus 310-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In one embodiment, the subframe generation module 310-*a* may receive a plurality of regular pilot symbols (first pilot symbols), a plurality of data packets, and a plurality of scatter pilot symbols (second pilot symbols) as identified by the packet identification module 305-*a* via communication links 306-*a*, 306-*b* and 306-*c*. The subframe generation module 310-*a* may temporarily store the received regular pilot symbols in regular pilot storage 405, data packets in data storage 410, and scatter pilot symbols in scatter pilot storage 415 respectively. Regular pilot storage 405, data storage 410 and scatter pilot storage 415 may embody any suitable storage systems including, but not limited to buffers, Random Access Memory (RAM) and/or queues.

In some examples, the regular pilot symbols configured to facilitate channel estimation are stored in the regular pilot storage 405 prior to being forwarded to the OFDM processing sub-module 420 via communication link 402. The OFDM processing sub-module 420 may receive a plurality of regular pilot symbols in the frequency domain and apply an OFDM processing to generate a plurality of first subframes. In some examples, the OFDM processing may include, for example, mapping the plurality of received regular pilot symbols onto a signal constellation using known mapping schemes. Each signal on the constellation may have an equal energy. The mapped signal constellation may then be converted from a frequency domain to a time domain by, for example, an inverse fast Fourier transform. The converted signal constellation may then be forwarded to a cyclic prefix insertion sub-module 435 via communication link 412 for insertion of a CP onto the OFDM pilot symbol block.

In certain examples, the cyclic prefix insertion sub-module 435 may insert a cyclic prefix (CP) in every block according to the system specification. The insertion of a CP to the generated subframes allow the transmitted signal to maintain orthogonal characteristics at severe transmission conditions. A CP may be a repetition of the last data symbols of a block and may be appended to prevent contamination of a block by intersymbol interference (ISI) from a previous block. Following insertion of a CP, the generated subframe may be forwarded via communication link 416 to the transmitter device transmitter module 220-*b* to be modulated onto a multi-carrier channel to the receiving device.

In yet other examples, data packets, as identified by the packet identification module 305-*a*, and configured for transmission on the wireless channel may be stored in the data storage 410 prior to being processed by the single-carrier processing sub-module 425. Similarly, scatter pilot symbols configured to facilitate channel estimation tracking may be stored in the scatter pilot storage 415. In contrast to the regular pilot symbols, the plurality of data packets and scatter pilot symbols obtained by the single-carrier processing sub-module 425 may be in time domain. The single-carrier processing sub-module 425 may receive a plurality of data packets via communication link 404 and a plurality of scatter pilot symbols via communication link 408. However, prior to its transmission to the single-carrier processing sub-module 425, the scatter pilot symbols may first be routed through an interleaver sub-module 430 via communication link 406. The interleaver sub-module 430 may forward the plurality of scatter pilot symbols for insertion into data subframes on a pre-determined time delay. In some examples, the pre-determined time delay may be an equal length delay period. In yet another example, the time delay may be either pseudo-random or dynamically adjustable.

The single-carrier processing sub-module 425 may process a plurality of time domain data packets and scatter pilot symbols according to a second processing technique. In one example, the second processing technique may comprise SC. The single-carrier processing sub-module 425 may generate a plurality of second subframes based in part on the received data packets, and a plurality of scatter pilots. The generated subframes may be forwarded to the cyclic prefix insertion sub-module 435 via communication link 414. The cyclic prefix insertion sub-module 435 may insert a CP in every received block according to the system specification and may forward the CP-SC generated subframes via communication link 416 to the transmitter device transmitter module 220-*b* for modulation onto a multi-carrier channel to the receiving device.

Figure 5:
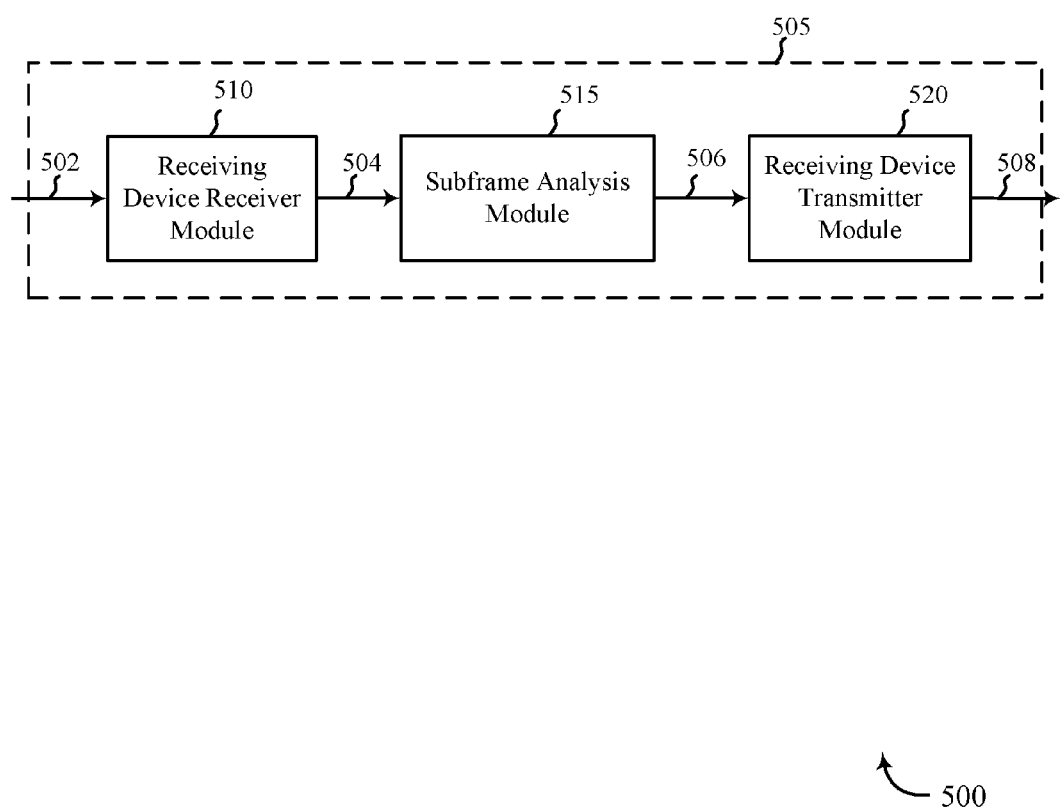
FIG. 5 is a block diagram of the receiving device that may be implemented in either the base station and/or the mobile device, in accordance with various aspects of the present disclosure.

FIG. 5 shows a block diagram 500 of an apparatus 505 for use in wireless communication, in accordance with various aspects of the present disclosure. In some examples, the apparatus 505 may be an example of a receiving device, for example, one or more of the base stations 105 and/or UEs 115 described with reference to FIG. 1. The apparatus 505 may also be a processor. The apparatus 505 may include a receiving device receiver module 510, a subframe analysis module 715, and/or a receiving device transmitter module 520. Each of these components may be in communication with each other.

The components of the apparatus 505 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiving device receiver module 510 may be used to receive various types of data and/or control signals (i.e., transmissions, pilot symbols) over communication links of a wireless communication system, such as one or more communication links 125 of the wireless communication system 100 described with reference to FIG. 1. The receiver module 510 may further receive data and/or control signals from internal components (not shown) of the receiving device 505. The receiver module 510 may receive information such as packet, data, and/or signaling information via signal 502. The received information may be utilized by the subframe analysis module 515 to establish communication with the transmitting device 205 as described with reference to FIG. 2 and/or FIG. 3.

The subframe analysis module 515 may be used to control the receipt of wireless communications via the receiver module 510 and/or demodulate the received control signals (pilot symbols) and data packets in accordance with various aspects of the present disclosure. In some examples, subframe analysis module 515 may be configure to analyze a plurality of frames and subframes based in part on the control information (e.g., pilot symbols) and a plurality of data packets obtained from the receiving device receiver module 510 via communication link 504. The subframe analysis module 515 may identify each of the received types of data and/or control signals to estimate and track channel conditions between the transmitting device and the receiving device. Each of the transmitting device and/or receiving device may be at least one or more base stations and/or UEs as described with reference to FIG. 1.

The receiving device transmitter module 520 may include at least one RF transmitter. The receiving device transmitter module 520 may be used to transmit various types of data and/or control signals (i.e., transmissions, pilot symbols) over one or more communication links of a wireless communication system, such as one or more communication links 125 of the wireless communication system 100 described with reference to FIG. 1 in accordance with the hybrid waveforms described in present disclosure.

Figure 6:
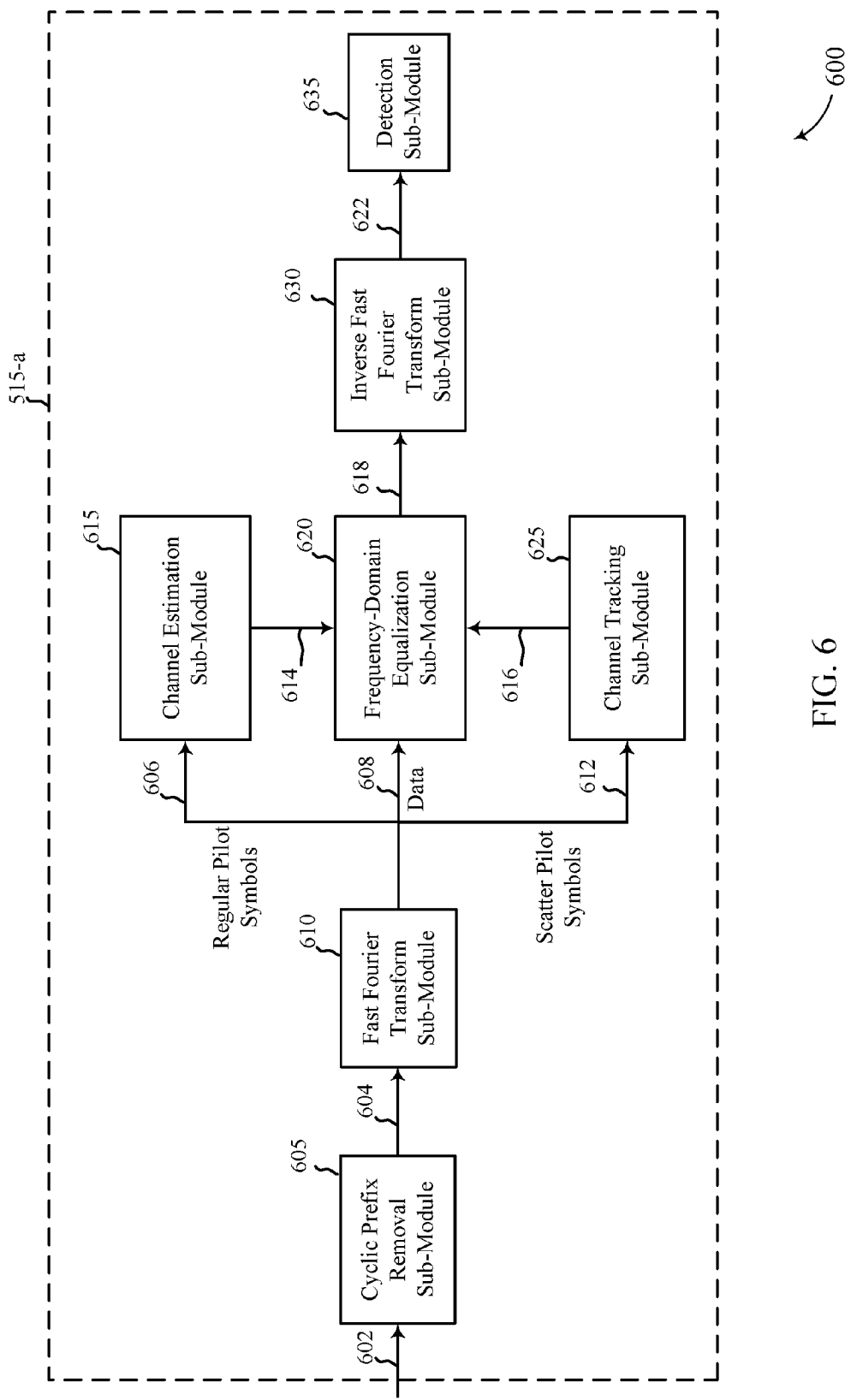
FIG. 6 is a block diagram of the subframe analysis module, in accordance with various aspects of the present disclosure.

FIG. 6 shows a block diagram 600 of an apparatus 515-a, in accordance with various aspects of the present disclosure. In some examples, the apparatus 515-a may be an example of the subframe analysis module 515 described with reference to FIG. 5. The apparatus 515-a may also be a processor. The apparatus 515-a may include a cyclic prefix removal sub-module 605, fast Fourier transform sub-module 610, channel estimation sub-module 615, frequency-domain equalization sub-module 620, channel tracking sub-module 625, inverse fast Fourier transform sub-module 630 and detection sub-module 635. Each of these components may be in communication with each other.

The components of the apparatus 515-a may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the subframe analyses module 515-a may receive a plurality of symbols from the transmitting device over a wireless channel. The received symbols may be forwarded to the subframe analysis module 515-a via communication link 602 between the subframe analysis module 515-a and the receiving device receiver module 520 as described with reference to FIG. 5. The received signal 602 may reflect time domain of received frame and/or packet reflecting channel corruptions, phase noise and additive white Gaussian noise (AWGN). The cyclic prefix removal sub-module 605 may remove the appended CP from each of the received symbols prior to transmitting the symbols to the fast Fourier transform sub-module 610 via communication link 604. In some examples, the fast Fourier transform sub-module 610 may convert the received time domain symbols into frequency domain symbols to allow the channel estimation sub-module 615 and the channel tracking sub-module 625 to conduct channel estimation.

The regular pilot symbols derived from converting the received regular pilot symbols from time domain to frequency domain may be forwarded to the channel estimation sub-module 615 via communication link 606. Similarly, the scatter pilot symbols may be forwarded to the channel tracking sub-module 625 via link 612 for processing upon conversion to the frequency domain. Each of the channel estimation sub-module 615 and channel tracking sub-module 625 may extract the pilot symbols from the received signal, for example through correlation, and determine the channel estimate based in part on the received pilot symbols.

In some instances, the channel estimation sub-module 615 may multiply the received pilot symbols with a complex conjugate of the known pilot symbols to obtain channel state information of the wireless channel between the transmitting device and the receiving device. The channel estimation sub-module 615 may estimate channel for all 512 subcarriers based on the first two blocks in frequency domain and apply the channel estimation to the received frame/packet. In further example, the channel estimation sub-module 615 and channel tracking sub-module 625 may estimate channel conditions based on any one of Least Square (LS), Minimum Mean-Square Error (MMSE) or Least Mean-Square (LMS) estimators to determine the best estimate of the amplitude and phase errors for each of the transmission frequencies. Similarly, the received scatter pilot symbols may be processed by the channel tracking sub-module 625 to track the channel conditions following the channel estimation based in part on the regular pilot symbols. In certain examples, the channel estimates may be fed into a frequency domain equalizer sub-module 620 via communication links 614 and 616 in order to provide reliable data detection. In accordance with the present disclosure, signal 616 may provide estimated phase noise in frequency domain for the received frame/packet.

In some examples, the frequency domain equalization sub-module 620 may receive data symbols from the fast Fourier transform sub-module 610 via communication link 608. The frequency domain equalization sub-module may yet further receive channel estimates from the channel estimation sub-module 615 via communication link 614 and channel tracking sub-module 625 via link 616. Based in part on the estimated channel conditions, the frequency domain equalization sub-module 620 may correct the distortions introduced by the channel by applying amplitude and phase corrections specific to each of the frequencies used. The corrected signal is thereafter forwarded to the inverse fast Fourier transform sub-module 630 via link 618 to convert the signal from a frequency domain back to the time domain. In accordance with the illustrated embodiment, signal 618 may reflect the received data in frequency domain compensated for channel fading and phase noise. In some instances, signal 618 may comprise AWGN. The converted time domain signal is transmitted from the inverse fast Fourier transform sub-module 630 to the detection sub-module 635 via communication link 622 in order to detect undistorted data packets received at the receiving device. In some examples, signal 622 may reflect recovered original transmitted data in time domain with AWGN. In yet another embodiments, signal 622 may be recovered original transmitted data in time domain with AWGN compensated.

Figure 7:
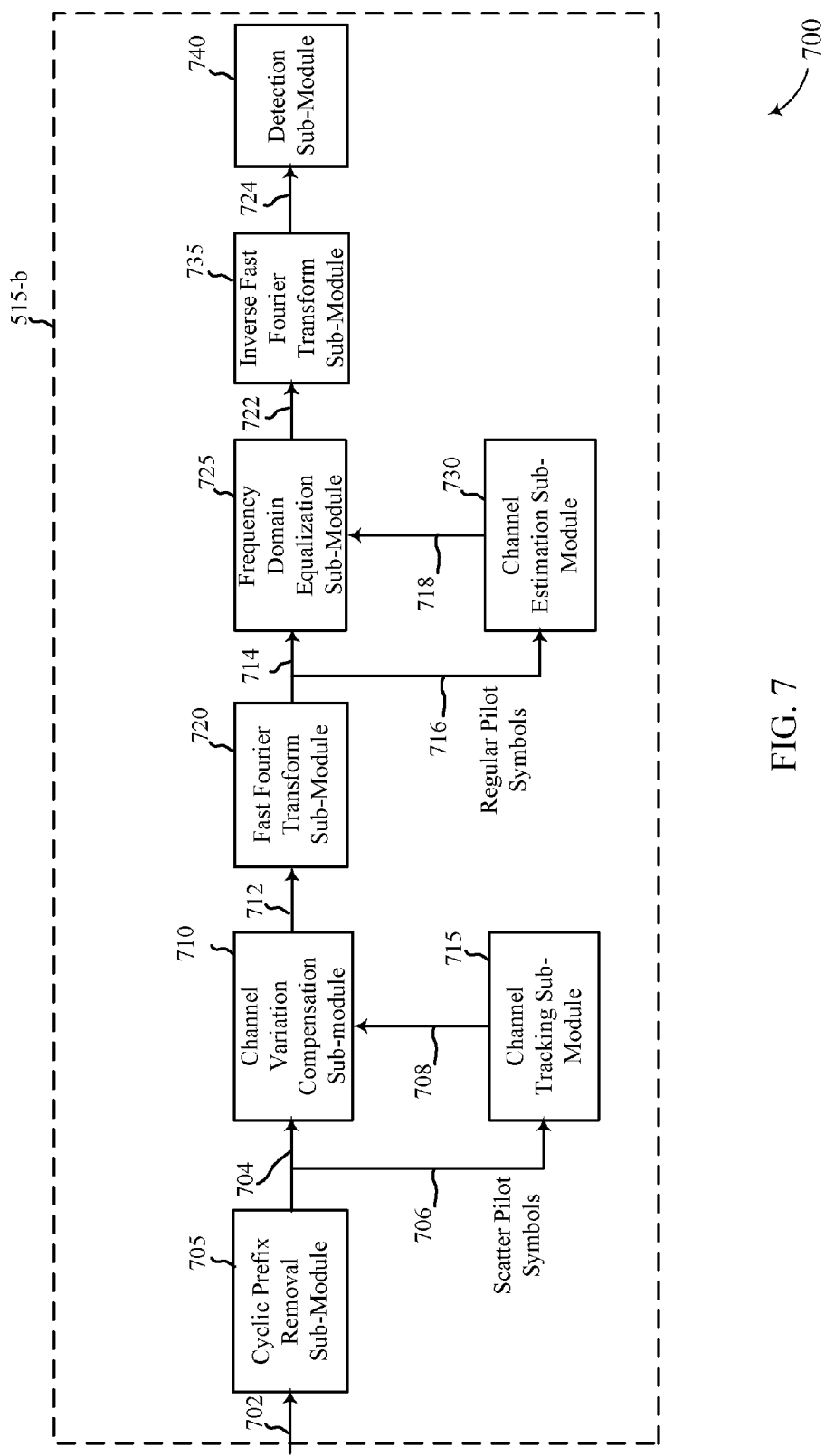
FIG. 7 is a block diagram of the subframe analysis module, in accordance with various aspects of the present disclosure.

FIG. 7 shows a block diagram 700 of an apparatus 515-b, in accordance with various aspects of the present disclosure. In some examples, the apparatus 515-b may be an example of the subframe analysis module 710 described with reference to FIG. 5. The apparatus 515-b may also be a processor. The apparatus 515-b may include a cyclic prefix removal sub-module 705, channel variation compensation sub-module 710, channel tracking sub-module 715, fast Fourier transform sub-module 720, frequency-domain equalization sub-module 725, channel estimation sub-module 730, inverse fast Fourier transform sub-module 735 and detection sub-module 740. Each of these components may be in communication with each other.

The components of the apparatus 710-b may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some embodiments, the subframe analyses module 515-b may receive a plurality of symbols from the transmitting device over a wireless channel. The received symbols may be forwarded to the subframe analysis module 515-b via communication link 702 between the subframe analysis module 515 and the receiving device receiver module 510 as described with reference to FIG. 5. The received signal 702 may comprise a frame/packet reflected in time domain comprising any number of channel corruption, phase noise and/or AWGN. The cyclic prefix removal sub-module 705 may remove the appended CP from each of the received symbols prior to transmitting the scatter pilot symbols to the channel tracking sub-module 715 via communication link 706. In such examples, the symbols may be forwarded from the cyclic prefix removal sub-module 705 to the channel variation compensation sub-module 710 via communication link 704. In some examples of the present disclosure, the channel tracking may be performed in the time domain. The channel tracking sub-module 715 may extract the scatter pilot symbols from the received signal, for example through correlation, and determine the channel estimate based in part on the received pilot symbols. The channel tracking sub-module 715 may further track the channel conditions based in part on the scatter pilot symbols and forward the channel tracking conditions to the channel variation compensation sub-module 710 via communication link 708.

In some examples, the channel variation compensation sub-module 710 may compensate the received symbols and/or subframes based on the channel conditions tracked by the channel tracking sub-module 715. The channel variation compensation sub-module 710 may further forward the compensated symbols and/or subframes to the fast Fourier transform sub-module 720 via communication link 712. Signal 712 provides a frame/packet in time domain compensated for various channel corruptions, phase noise, and AGWN to the fast Fourier transform sub-module 720. The fast Fourier transform sub-module 720 may convert the received time domain compensated symbols into frequency domain symbols to allow the channel estimation sub-module 730 to conduct channel estimation. In some instances, the channel estimation sub-module 730 may multiply the received pilot symbols with a complex conjugate of the known pilot symbols to obtain channel state information of the wireless channel between the transmitting device and the receiving device.

In yet further example, the channel estimation sub-module 730 may estimate channel conditions based on any one of Least Square (LS), Minimum Mean-Square Error (MMSE) or Least Mean-Square (LMS) estimators to determine the best estimate of the amplitude and phase errors for each of the transmission frequencies. The channel estimates may be fed into a frequency domain equalizer sub-module 725 via communication links 718 in order to provide reliable data detection.

In some examples, the frequency domain equalization sub-module 725 may receive data symbols from the fast Fourier transform sub-module 720 via communication link 714. Based in part on the estimated channel conditions, the frequency domain equalization sub-module 725 may correct the distortions introduced by the channel by applying amplitude and phase corrections specific to each of the frequencies used. The corrected signal may thereafter be forwarded to the inverse fast Fourier transform sub-module 735 via link 722 to convert the signal from a frequency domain back to the time domain. In some examples, the converted time domain signals may be transmitted from the inverse fast Fourier transform sub-module 735 to the detection sub-module 740 via communication link 724 in order to detect undistorted data packets received at the receiving device.

Figure 8:
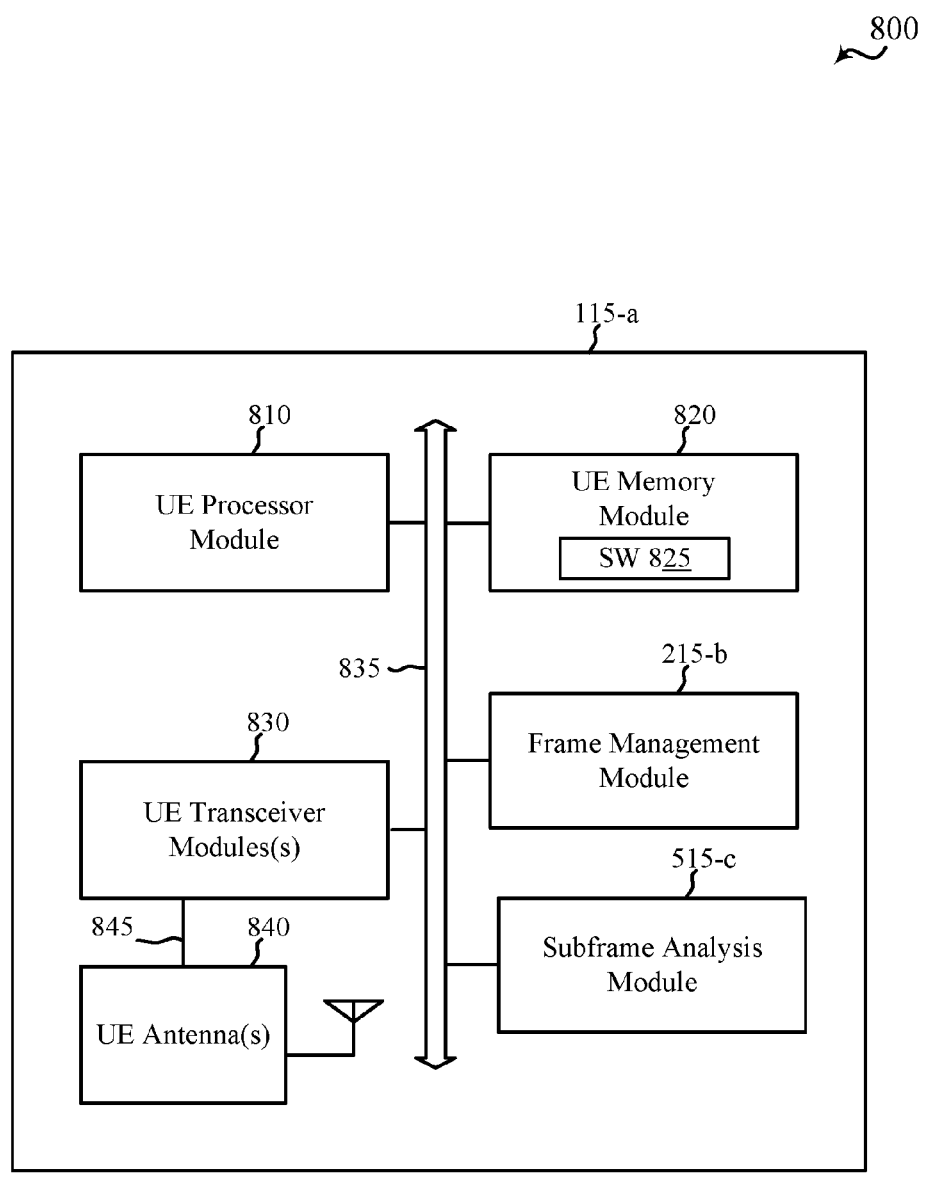
FIG. 8 is an example of a mobile device in accordance with various aspects of the present disclosure.

FIG. 8 shows a block diagram 800 of a UE 115-a configured for wireless communication, in accordance with various aspects of the present disclosure. The UE 115-a may have various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The UE 115-a may in some cases have an internal power supply (not shown), such as a small battery, to facilitate mobile operation. In some embodiments, the UE 115-a may be an example of one or more aspects of one of the devices 115 described with reference to FIG. 1. The UE 115-a may be configured to implement at least some of the features and functions described with reference to FIG. 1, 2, 3, and/or FIG. 5. The UE 115-a may be configured to communicate with one or more of the access points or devices 105 described with reference to FIG. 1 and/or FIG. 2.

The UE 115-a may include a UE processor module 810, a UE memory module 820, at least one transceiver module (represented by UE transceiver module(s) 830), at least one antenna (represented by UE antenna(s) 840), frame management module 215-b and/or a subframe analysis module 515-c. Each of these components may be in communication with each other, directly or indirectly, over one or more buses 835.

The UE memory module 820 may include random access memory (RAM) and/or read-only memory (ROM). The UE memory module 820 may store computer-readable, computer-executable software (SW) code 825 containing instructions that are configured to, when executed, cause the UE processor module 810 to perform various functions described herein for communicating over a wireless communications system. Alternatively, the software code 825 may not be directly executable by the UE processor module 810 but be configured to cause the UE 115-a (e.g., when compiled and executed) to perform various of the functions described herein.

The UE processor module 810 may include an intelligent hardware device, e.g., a central processing unit (CPU), a microcontroller, an ASIC, etc. The UE processor module 810 may process information received through the UE transceiver module(s) 830 and/or information to be sent to the UE transceiver module(s) 830 for transmission through the UE antenna(s) 840. The UE processor module 810 may handle various aspects of communicating over a wireless communications system.

The UE transceiver module(s) 830 may include a modem configured to modulate packets and provide the modulated packets to the UE antenna(s) 840 for transmission, and to demodulate packets received from the UE antenna(s) 1040. The UE transceiver module(s) 830 may in some cases be implemented as one or more transmitter modules and one or more separate receiver modules. The UE transceiver module(s) 830 may support communications in a first spectrum, such as a WWAN or cellular spectrum, and in a second spectrum, such as a WLAN spectrum. The UE transceiver module(s) 830 may be configured to communicate bi-directionally, via the UE antenna(s) 840, with one or more of the access points or devices 105 (e.g., eNBs and/or WLAN access points) described with reference to FIG. 1. While the UE 115-a may include a single antenna, there may be embodiments in which the UE 115-a may include multiple UE antennas 840.

The frame management module 215-b may be an example of one or more aspects of the frame management module 215 described with reference to FIGS. 2 and/or 3. The frame management module 215-b may be configured to generate subframes based in part on a hybrid waveform comprising an OFDM based regular pilot symbols, and CP-SC based scatter pilot symbols and data packets. The frame management module 215-b, or portions of it, may include a processor, and/or some or all of the functionality of the frame management module 215-b may be performed by the UE processor module 810 and/or in connection with the UE processor module 810.

Similarly, the subframe analysis module 515-c may be an example of one or more aspects of subframe analysis module 515 as described with reference to FIGS. 7 and/or 8. The subframe management module 515-c may be configured to receive and analyze a plurality of symbols received over the wireless channel to conduct channel estimation and data detection in accordance with various aspects of the present disclosure. The subframe analysis module 515-c, or portions of it, may include a processor, and/or some or all of the functionality of the subframe analysis module 515-c may be performed by the UE processor module 810 and/or in connection with the UE processor module 810.

Figure 9:
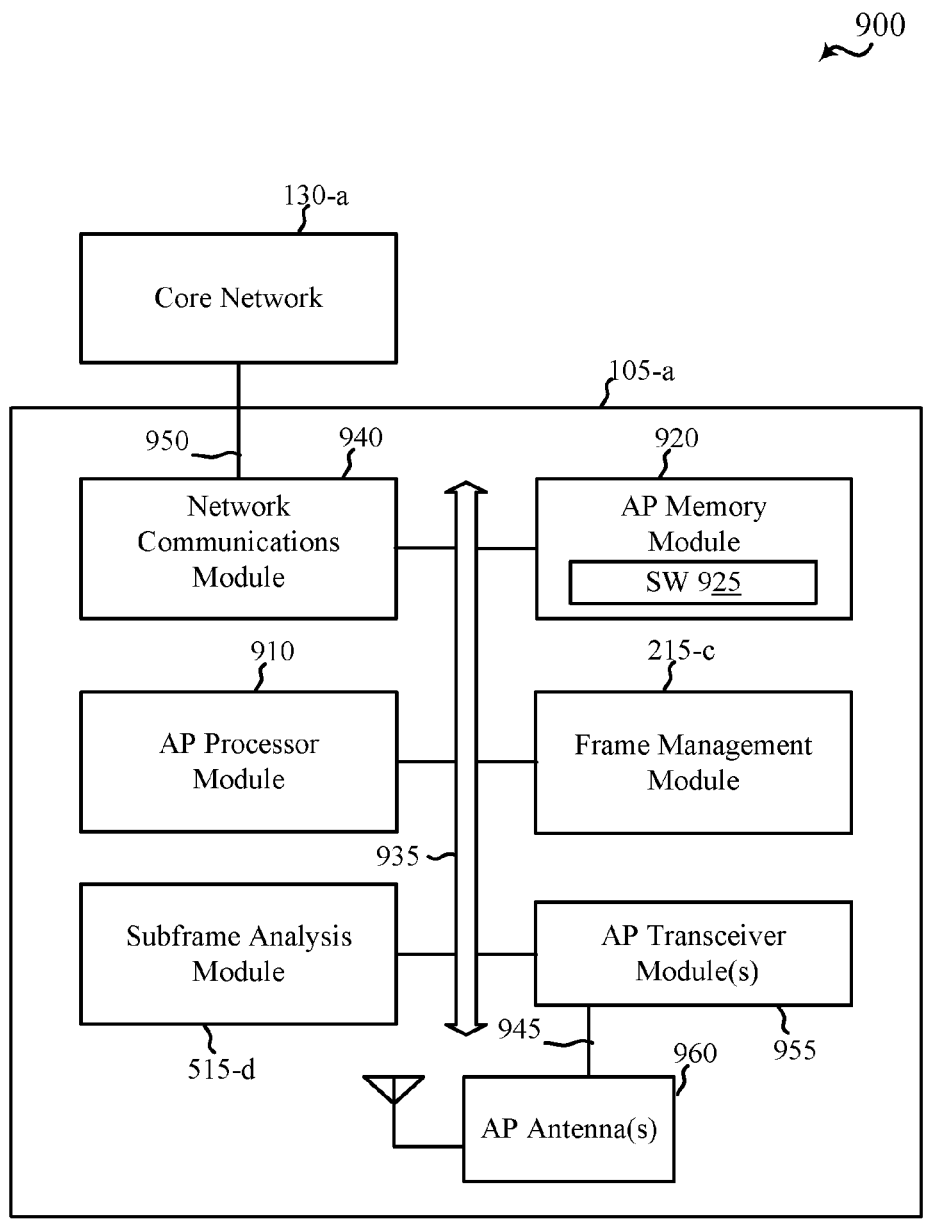
FIG. 9 is an example of a base station or access point in accordance with various aspects of the present disclosure.

FIG. 9 shows a block diagram 900 illustrating a WLAN access point 105-a configured for wireless communication, in accordance with various aspects of the present disclosure. In some embodiments, the WLAN access point 105-a may be an example of one or more aspects of one of the access points or devices 105 described with reference to FIG. 1. The WLAN access point 105-a may be configured to implement at least some of the features and functions described with reference to FIG. 1. The WLAN access point 105-a may include an AP processor module 910, an AP memory module 920, at least one transceiver module (represented by AP transceiver module(s) 955), at least one antenna (represented by AP antenna(s) 960), a frame management module 215-c and/or subframe analysis module 515-d. Each of these components may be in communication with each other, directly or indirectly, over one or more buses 935.

The AP memory module 920 may include RAM and/or ROM. The AP memory module 920 may store computer-readable, computer-executable software (SW) code 925 containing instructions that are configured to, when executed, cause the AP processor module 910 to perform various functions described herein. Alternatively, the software code 925 may not be directly executable by the AP processor module 910 but be configured to cause the WLAN access point 105-a (e.g., when compiled and executed) to perform various of the functions described herein.

The AP processor module 910 may include an intelligent hardware device, e.g., a CPU, a microcontroller, an ASIC, etc. The AP processor module 910 may process information received through the AP transceiver module(s) 955 and/or the network communications module 940. The AP processor module 910 may also process information to be sent to the AP transceiver module(s) 955 for transmission through the AP antenna(s) 960 or to the network communications module 940 for transmission to a network 945 (e.g., the Internet, or a core network such as the core network 130 described with reference to FIG. 1).

The AP transceiver module(s) 955 may include a modem configured to modulate packets and provide the modulated packets to the AP antenna(s) 960 for transmission, and to demodulate packets received from the AP antenna(s) 960. The AP transceiver module(s) 955 may in some cases be implemented as one or more transmitter modules and one or more separate receiver modules. The AP transceiver module(s) 955 may support communications in a first spectrum, such as a WLAN spectrum, and in some cases a second spectrum, such as a WWAN spectrum. The AP transceiver module(s) 955 may be configured to communicate bi-directionally, via the AP antenna(s) 960, with one or more of the UEs or devices 115 described with reference to FIGS. 1 and/or 2, for example. The WLAN access point 105-a may typically include multiple AP antennas 960 (e.g., an antenna array). The WLAN access point 105-a may communicate with the network(s) 130-a through the network communications module 940.

The frame management module 215-c may be an example of one or more aspects of the frame management module 215 described with reference to FIGS. 3 and/or 3. The frame management module 215-c may be configured to generate subframes based in part on a hybrid waveform comprising an OFDM based regular pilot symbols and CP-SC based data packets. The frame management module 215-c, or portions of it, may include a processor, and/or some or all of the functionality of the frame management module 215-c may be performed by the AP processor module 910 and/or in connection with the AP processor module 1110.

Similarly, the subframe analysis module 515-d may be an example of one or more aspects of subframe analysis module 515 as described with reference to FIGS. 5 and/or 6. The subframe management module 515-d may be configured to receive and analyze plurality of symbols received over the wireless channel to conduct channel estimation and data detection in accordance with various aspects of the present disclosure. The subframe analysis module 515-d, or portions of it, may include a processor, and/or some or all of the functionality of the subframe analysis module 515-d may be performed by the AP processor module 910 and/or in connection with the AP processor module 910.

Figure 10:
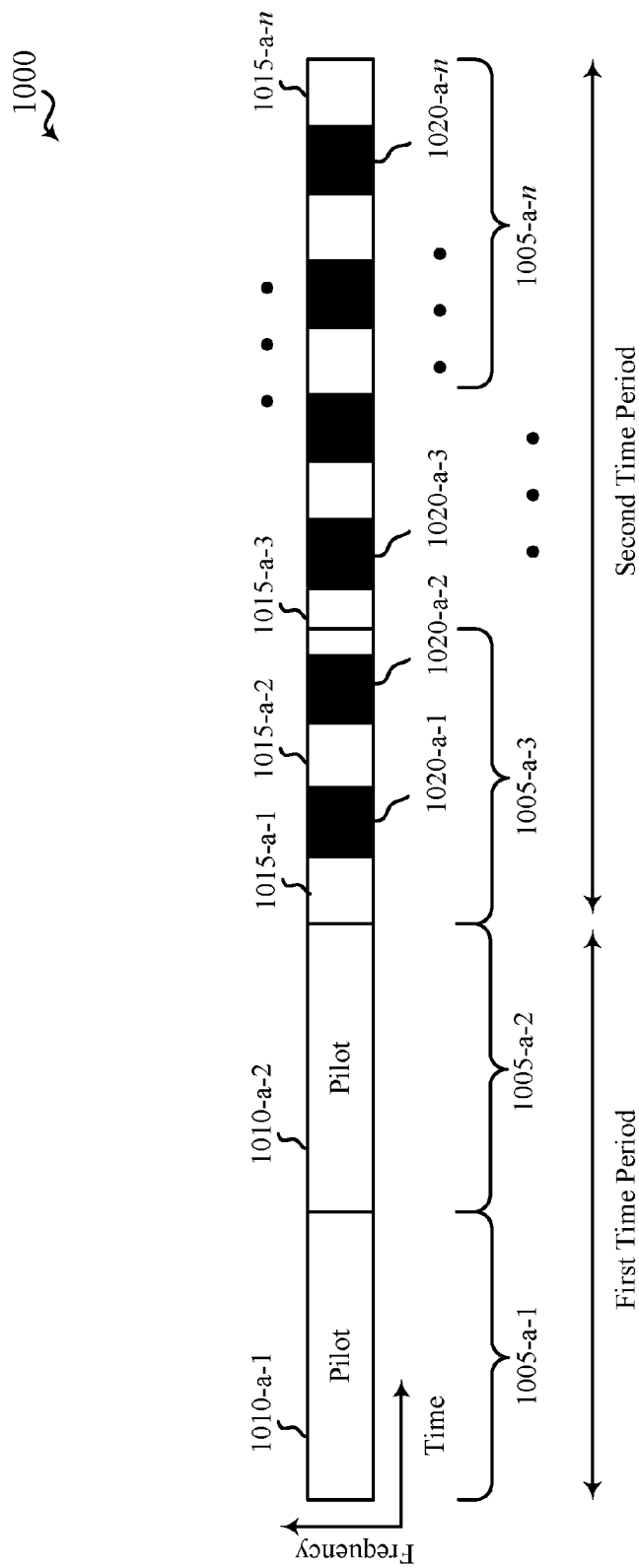
FIG. 10A is an example of frame structure based on the hybrid waveform in accordance with aspects of the present disclosure.
FIG. 10B is an alternative example of frame structure based on the hybrid waveform in accordance with various aspects of the present disclosure.
Figure 10:
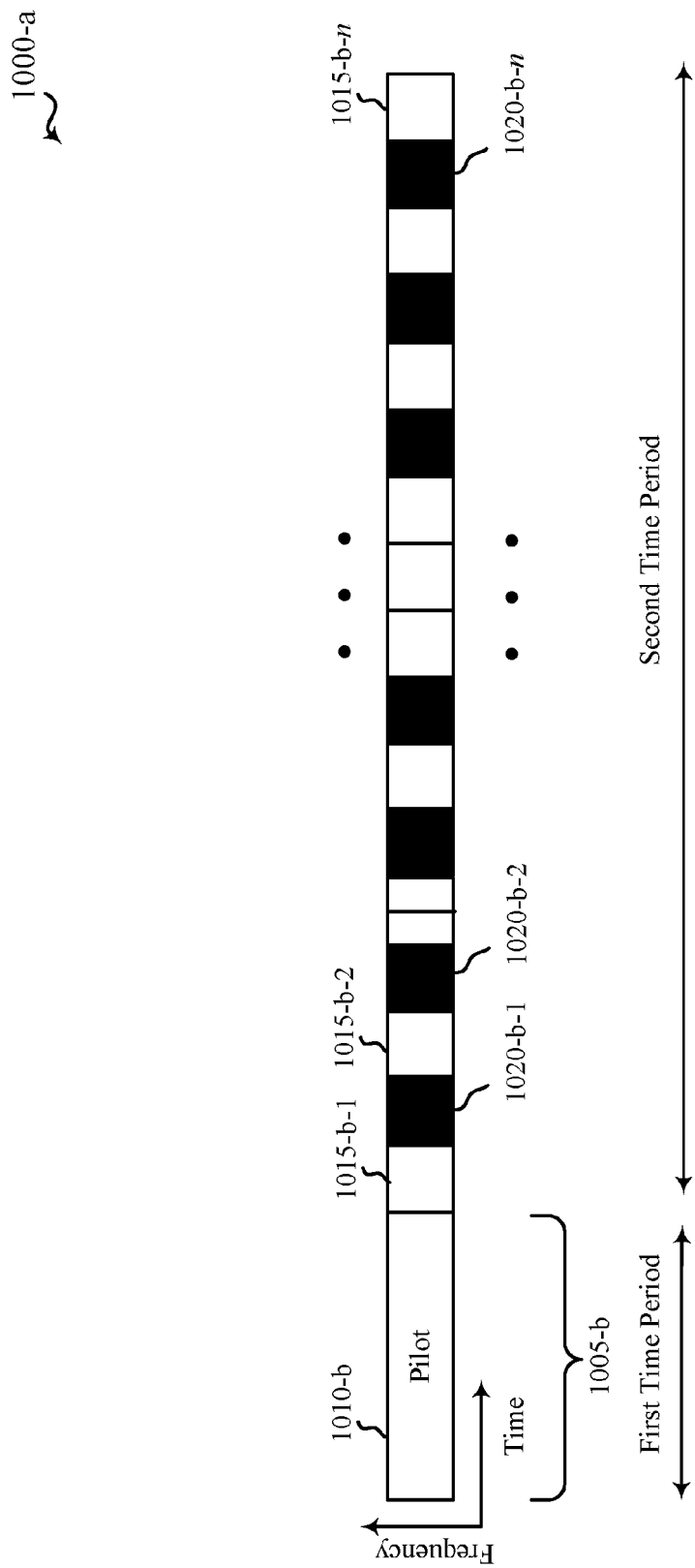

FIGS. 10A and 10B, show an example of a frame structure 1000, 1000-a based on the hybrid waveform in accordance with various aspects of the present disclosure. In some embodiments, the frame structures 1005-a-n, 1005-b may be examples of one or more frames generated by various aspects of the frame management module 215 described with reference to FIGS. 2 and/or 3. The frames in accordance with the present disclosure may be divided into a plurality of subframes or blocks 1005-a-n, 1005-b. Each frame 1000, 1000-a may contain either 8 or 16 subframes and/or blocks 1005-a-1, 1005-a-2, 1005-a-n, wherein each subframe comprising 512 modulation symbols.

With reference to FIG. 10A, in certain embodiments, the frame management module may generate a first subframe 1010-a-1 based at least in part on the regular pilot symbols using an OFDM processing technique. In some examples, the regular pilot subframes 1010-a-1, 1010-a-2 may extend the first two subframe blocks 1005-a-1, 1005-a-2 during the first time period. In yet another example, with reference to FIG. 10B, the regular pilot subframe 1010-b may transmit on only the first subframe 1005-b during a shortened first time period. In the foregoing examples, each subframe block 1005-*a*-1, 1005-*a*-2 may comprise 512 modulation symbols carrying regular pilots. The regular pilot subframe and/or blocks may be repeated every 16 blocks.

In certain examples illustrated in FIGS. 10A and 10B, a frame management module of the transmitter device may generate a second subframe 1005-*a*-3 using a CP-SC processing technique during a second time period. The second subframe 1005-*a*-3 may be based at least in part on a plurality of data packets 1015-*a*-1, 1015-*a*-*n* and a plurality of scatter pilot symbols 1020-*a*-1, 1020-*a*-*n*. Similar to regular pilot blocks, the data blocks may comprise 512 modulation symbols in each data block. In some examples, the scatter pilot symbols 1020-*a*-1, 1020-*a*-*n* may be interleaved, inserted or multiplexed between the plurality of data packets 1015-*a*-1, 1015-*a*-*n* on equal time delay as illustrated in FIG. 10A. In such instances, the scatter pilot symbols 1020-*a*-1, 1020-*a*-*n* may be interleaved every 64 data modulation symbols with each block. As a result, each data block may comprise eight scatter pilot symbols 1020-*a*-1, 1020-*a*-*n*. In an additional or alternative example, the scatter pilot symbols 1020-*b*-1, 1020-*b*-*n* may be multiplexed into data packets 1015-*b*-1, 1015-*b*-*n* on varying time delay as illustrated in FIG. 10B.

In foregoing embodiments, the receiving device may receive the frames 1000, 1000-*a*. The subframe analysis module as discussed with reference to FIGS. 5, 6, 7, 8 and/or FIG. 9 may receive a plurality of first subframes 1005-*a*-1, 1005-*a*-2 encoded using OFDM processing technique comprising a plurality of regular pilot symbols 1010-*a*-1, 1010-*a*-2 during the first time period. In some examples, receiving device may further receive a plurality of second subframes 1005-*a*-3, 1005-*a*-*n* encoded using CP-SC processing technique based in part on the plurality of data packets 1015-*a*-*n* and scatter pilots 1020-*a*-*n*. The subframe analyses module may decode the received frame 1000, 1000-*a* and estimate channel conditions based in part on the received regular pilot symbols 1010-*a*-1 and/or 1010-*a*-2. The subframe analyses module may further track channel conditions based at least in part on the scatter pilots 1020-*a*-*n* interleaved within data packets 1015-*a*-*n*. Based on the estimated and tracked channel conditions, the subframe analysis module may be configured to detect the data packets 1015-*a*-*n* reliably and adjust for any distortions that may have been introduced during data transmission.

Figure 11:
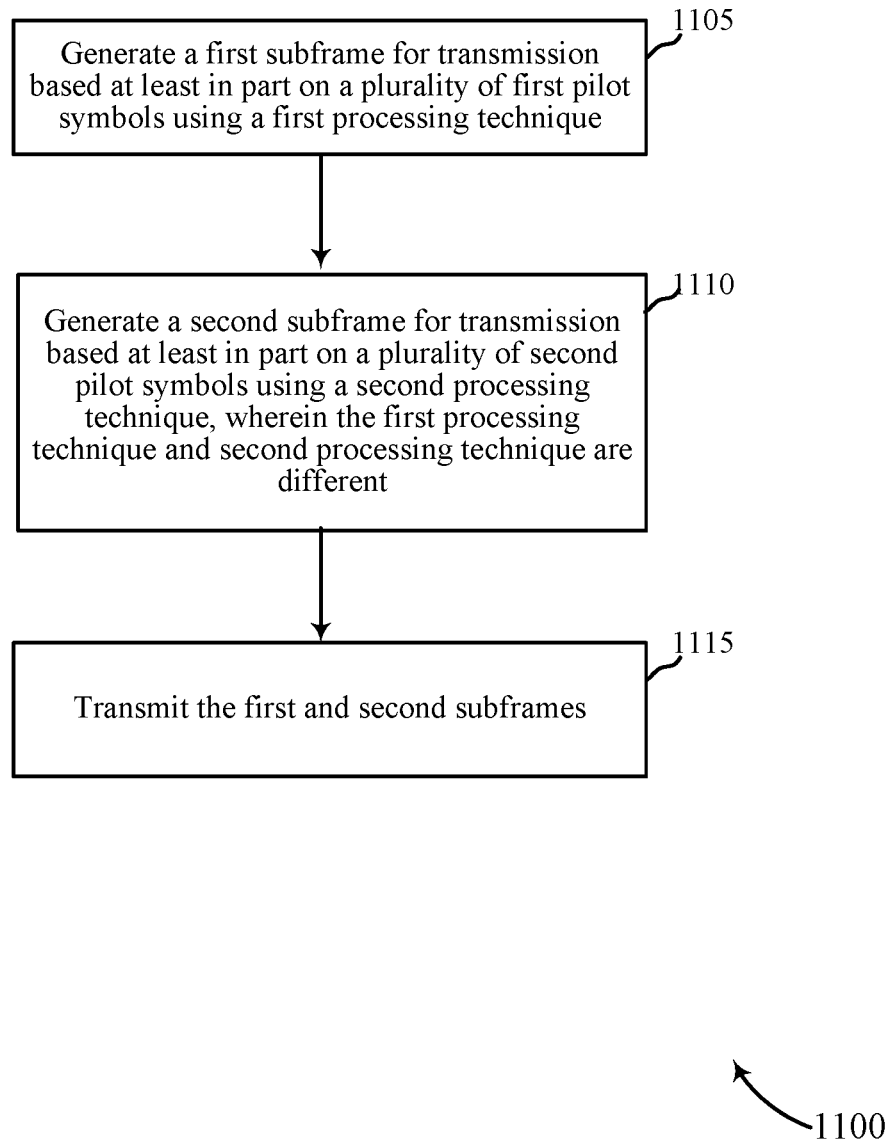
FIG. 11 is a flow chart illustrating an example of a method of providing wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the transmitting devices. In some examples, either a base station, access point or a mobile device may execute one or more sets of codes to control the functional elements of the base station to perform the functions described below.

At block 1105, the method 1100 may include generating a first subframe for transmission based at least in part on a plurality of first pilot symbols using a first processing technique. At block 1110, the method may further include generating a second subframe for transmission based at least in part on a plurality second pilot symbols using a second processing technique. The first processing technique and second processing techniques may be different. The operation(s) of block 1105 and/or 1110 may be performed by the subframe generation module 310 described with reference to FIGS. 3, 4, 8 and/or 9.

At block 1115, the method 1100 may further include transmitting the first and second subframes. The operation(s) of block 1115 may be performed by the transmitting device transmitter module 210 described with reference to FIGS. 2, 3, 4, 8 and/or 9.

Figure 12:
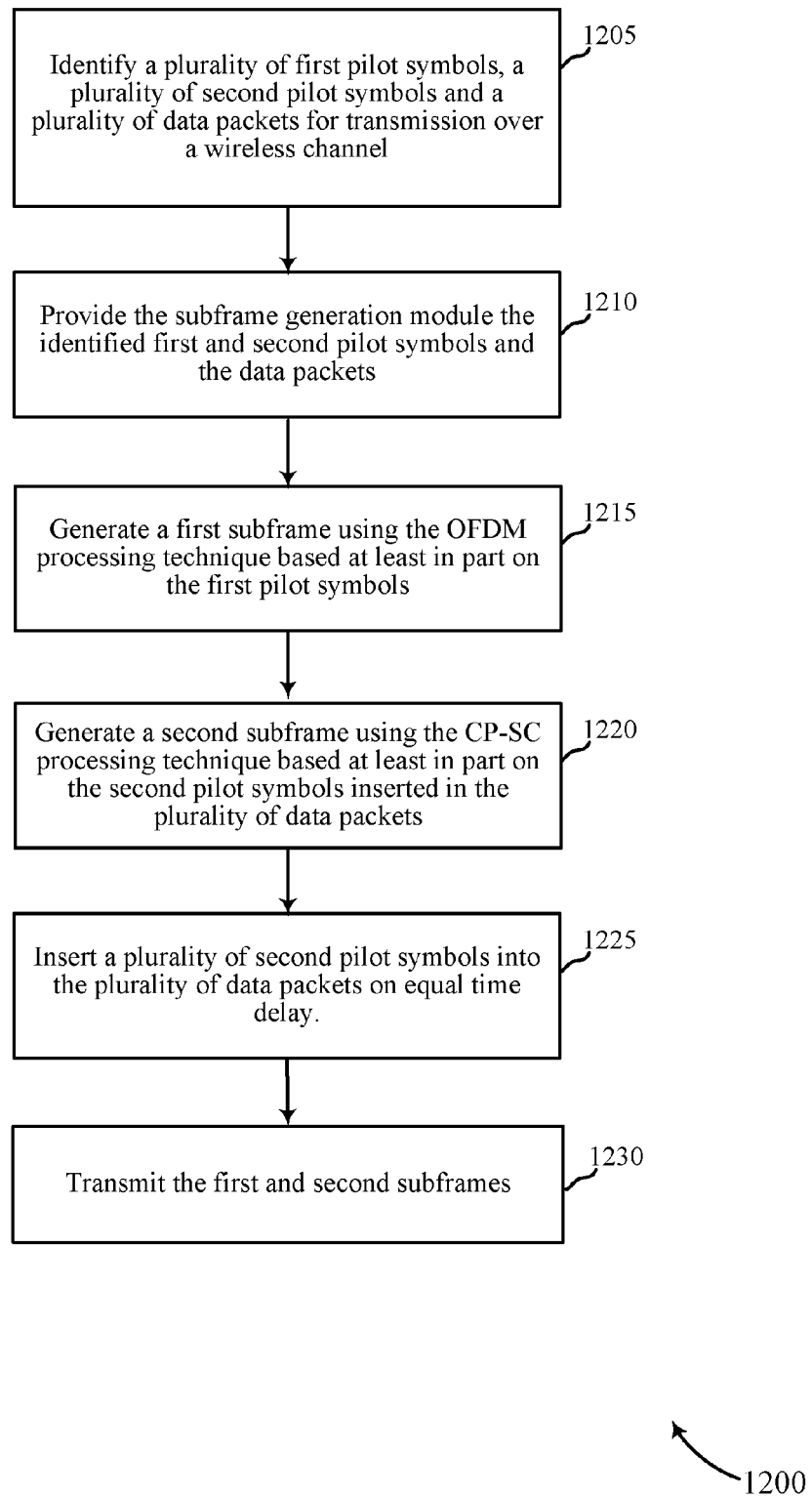
FIG. 12 is a flow chart illustrating an example of a method of providing wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the transmitting devices 205 described with reference to FIGS. 1 and/or 2. In some examples, either a base station, access point or a mobile device may execute one or more sets of codes to control the functional elements of the base station to perform the functions described below.

At block 1205, the method 1200 may include identifying a plurality of first pilot symbols, a plurality of second pilot symbols and a plurality of data packets for transmission over a wireless channel. In some examples, identifying a plurality of first pilot symbols, a plurality of second pilot symbols and a plurality of data packets may comprise distinguishing each of the received signals from frames configured for transmission. The operation(s) at block 1205 may be performed using the frame management module 215 described with reference to FIGS. 2, 8 and/or 9 and/or the packet identification module 305 described with reference to FIGS. 3 and/or 4.

At block 1210, the method 1200 may further include providing the subframe generation module the identified first and second pilot symbols and data packets. At block 1215, the method may comprise generating a first subframe using the OFDM processing technique based at least in part on the first pilot symbols. At block 1220, the method may further include generating a second subframe using the CP-SC processing technique based at least in part on the second pilot symbols inserted in the plurality of data packets. The operation(s) of blocks 1210, 1215 and/or 1220 may be performed using the packet identification module 305 and subframe generation module 310 as described with references to FIG. 3.

At block 1225, the method 1200 may comprise inserting a plurality of second pilot symbols into the plurality of data packets on equal time delay. The operation(s) of block 1325 may be performed using the interleaver sub-module 430 as described with reference to FIG. 4. Finally, at block 1230, the method 1200 may further include transmitting the first and second subframes. The operation(s) of block 1230 may be performed by the transmitting device transmitter module 220 described with reference to FIGS. 2, 3, 4, 8 and/or 9.

Figure 13:
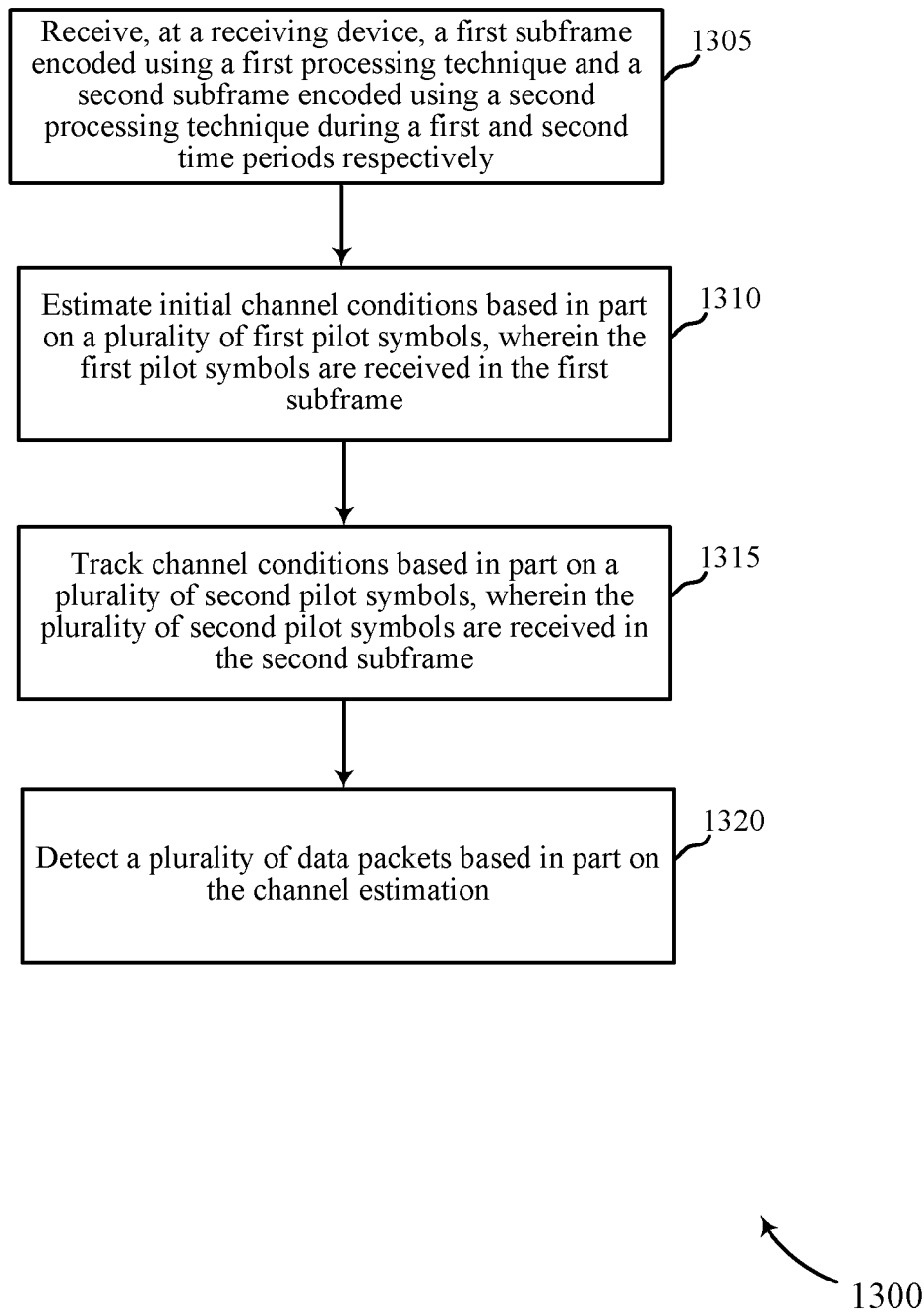
FIG. 13 is a flow chart illustrating an example of a method of providing wireless communication configured in the receiving device, in accordance with various aspects of the present disclosure.

FIG. 13 is a flow chart illustrating an example of a method 1300 for wireless communication configured in the receiving device, in accordance with various aspects of the present disclosure. For clarity, the method 1300 is described below with reference to aspects of one or more of the receiving devices described with reference to FIG. 1, 8, and/or FIG. 9. In some examples, either a base station, access point or a mobile device may execute one or more sets of codes to control the functional elements of the base station to perform the functions described below.

At block 1305, the method 1300 may comprise receiving, at the receiving device, a first subframe encoded using first processing technique and a second subframe encoded using second processing technique during a first and second time periods respectively. The operation(s) of block 1305 may be performed using the receiving device receiver module 510 as described with reference to FIG. 5.

At block 1310, the method may further comprise estimating initial channel conditions based in part on a plurality first pilot symbols. The first pilot symbols may be received, at the receiving device, in the first subframe. The operation(s) of block 1310 may be performed using channel estimation sub-module 615 and/or 730 as described with reference to FIGS. 6 and/or 7.

At block 1315, the method may further comprise tracking channel conditions based in part on a plurality of second pilot symbols. The plurality of second pilot symbols are received in the second subframe. The operation(s) of block 1315 may be performed using channel tracking sub-module 625 and/or 715 as described with reference to FIG. 6 and/or. Finally, at block 1320, the method 1300 may comprise detecting a plurality of data packets based in part on the channel estimations. The operation(s) of block 1320 may be performed using detection sub-module 635, 740 as described with reference to FIGS. 6 and/or 7.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for transmitting data in a wireless communication, comprising:
    generating a first subframe, having a first cyclic prefix, for transmission based at least in part on a plurality of first pilot symbols using a first processing technique;
    generating a second subframe, having a second cyclic prefix, for transmission based at least in part on a plurality of second pilot symbols using a second processing technique; and
    transmitting the first and second subframes.

2. The method of claim 1, further comprising configuring the first processing technique to be orthogonal frequency-division multiplexing (OFDM) and the second processing technique to be cyclic prefix single carrier (CP-SC).

3. The method of claim 1, further comprising:
    mapping the plurality of first pilot symbols onto a signal constellation with each signal on the signal constellation having approximately equal energy; and
    converting the signal constellation from a frequency domain to a time domain by applying an inverse fast Fourier transform (IFFT) to the plurality of first pilot symbols.

4. The method of claim 1, further comprising generating the first cyclic prefix to comprise a repetition of at least one of the first pilot symbols and generating the second cyclic prefix to comprise a repetition of at least one of the second pilot symbols or time domain data packets of the generated second subframe.

5. The method of claim 1, further comprising configuring the wireless communication transmission to operate over an unlicensed frequency spectrum comprising at least a 60 GHz band.

6. An apparatus for transmitting data in a wireless communication, comprising:
a processor;
a memory configured to be in electronic communications with the processor, the memory embodying instructions, the instructions being executable by the processor to:
generate a first subframe, having a first cyclic prefix, for transmission based at least in part on a plurality of first pilot symbols using a first processing technique;
generate a second subframe, having a second cyclic prefix, for transmission based at least in part on a plurality of second pilot symbols using a second processing technique; and
transmit the first and second subframes.

7. The apparatus of claim 6, the processor being further executable to configure the first processing technique to be orthogonal frequency-division multiplexing (OFDM) and the second processing technique to be cyclic prefix single carrier (CP-SC).

8. The apparatus of claim 6, the processor being further executable to:
map the plurality of first pilot symbols onto a signal constellation with each signal on the signal constellation having approximately equal energy; and
convert the signal constellation from a frequency domain to a time domain by applying an inverse fast Fourier transform (IFFT) to the plurality of first pilot symbols.

9. The apparatus of claim 6, the processor being further executable to generate the first cyclic prefix to comprise a repetition of at least one of the first pilot symbols and generating the second cyclic prefix to comprise a repetition of at least one of the second pilot symbols or time domain data packets of the generated second subframe.

10. The apparatus of claim 6, the processor being further executable to configure the wireless communication transmission to operate over an unlicensed frequency spectrum comprising at least a 60 GHz band.

11. An apparatus for transmitting data in a wireless communication, comprising:
a processor circuit module sized and shaped to generate a first subframe, having a first cyclic prefix, for transmission based at least in part on a plurality of first pilot symbols using a first processing technique and a second subframe, having a second cyclic prefix, for transmission based at least in part on a plurality of second pilot symbols using a second processing technique; and
a transmitter module sized and shaped for transmitting the first and second subframes over an unlicensed frequency spectrum comprising at least a 60 GHz band.

12. The apparatus of claim 11, the first processing technique comprising orthogonal frequency-division multiplexing (OFDM) and the second processing technique comprising cyclic prefix single carrier (CP-SC).

13. The apparatus of claim 11, the processor circuit module further configured to:
mapping the plurality of first pilot symbols onto a signal constellation, wherein each signal on the constellation has equal energy; and
converting the signal constellation from a frequency domain to a time domain by applying an inverse fast Fourier transform (IFFT) to the plurality of first pilot symbols.

14. The apparatus of claim 11, wherein the cyclic prefix contained within the first generated subframe includes a repetition of at least one of the first pilot symbols of the generated first subframe, and the cyclic prefix contained within the second generated subframe includes a repetition of at least one of the second pilot symbols or at least one of the time domain data packets of the generated second subframe.

15. The apparatus of claim 11, the processor circuit module configured to arrange in protocol data fashion the plurality of first pilot symbols for channel estimation and the plurality of second pilot symbols for channel estimation tracking.

16. A method for receiving data in a wireless communication, comprising:
receiving, at a receiving device, a first subframe encoded using a first processing technique having a first cyclic prefix, and a second subframe encoded using a second processing technique having a second cyclic prefix, during a first and second time periods respectively;
estimating initial channel conditions based in part on a plurality of first pilot symbols received, at the receiving device, in the first subframe;
tracking channel conditions based in part on a plurality of second pilot symbols received in the second subframe; and
detecting a plurality of data packets based in part on the channel estimations and in part on the channel estimation tracking information.

17. The method of claim 16, wherein the first processing technique comprises orthogonal frequency division multiplexing (OFDM) processing and the second processing technique comprises cyclic-prefix single-carrier (CP-SC) processing.

* * * * *